US012297067B2

(12) United States Patent
Matsuura

(10) Patent No.: US 12,297,067 B2
(45) Date of Patent: May 13, 2025

(54) BELT DEVICE, TRANSFER DEVICE, AND IMAGE FORMING APPARATUS

(71) Applicant: Hiroki Matsuura, Kanagawa (JP)

(72) Inventor: Hiroki Matsuura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 200 days.

(21) Appl. No.: 17/977,327

(22) Filed: Oct. 31, 2022

(65) Prior Publication Data

US 2023/0294937 A1 Sep. 21, 2023

(30) Foreign Application Priority Data

Jan. 24, 2022 (JP) ................................ 2022-008664

(51) Int. Cl.
*B65H 5/02* (2006.01)
*G03G 15/16* (2006.01)

(52) U.S. Cl.
CPC ......... *B65H 5/025* (2013.01); *G03G 15/1615* (2013.01); *B65H 2404/25* (2013.01); *B65H 2404/2692* (2013.01); *B65H 2801/06* (2013.01)

(58) Field of Classification Search
None
See application file for complete search history.

(56) References Cited

U.S. PATENT DOCUMENTS 5,017,969 A * 5/1991 Mitomi .............. G03G 15/1655 198/840
5,539,509 A * 7/1996 Tomoe ............... G03G 15/2053 399/331
6,321,049 B1 * 11/2001 Endoh .................. G03G 15/168 399/101
8,792,812 B2 * 7/2014 Fujioka ................ G03G 15/755 474/122
8,948,668 B2 * 2/2015 Yasumoto .............. G03G 15/50 399/302
9,033,134 B2 * 5/2015 Hozumi ............. G03G 15/1615 198/806
10,947,072 B2 * 3/2021 Nakajima .............. G03G 15/02
(Continued)

FOREIGN PATENT DOCUMENTS

JP 2017-058651 3/2017
JP 2017-151201 8/2017
JP 2017-161877 9/2017

*Primary Examiner* — Kavel Singh
(74) *Attorney, Agent, or Firm* — Harness, Dickey & Pierce, P.L.C.

(57) ABSTRACT

A belt device includes a belt wound around support rotators, to travel as the support rotators rotate; a belt contact member on a rotation shaft of one of the support rotators, to contact an end of the belt and move in an axial direction of the rotation shaft with the belt; a displacement member on the rotation shaft and including an inclined face to move the one support rotator, to move in the axial direction as the belt contact member moves; a guide to contact the inclined face and restrict a moving direction of the displacement member; a shaft support rotatably supporting the one support rotator and the rotation shaft; a restriction member to restrict movement of the one support rotator and the rotation shaft; and an elastically deformable intermediate member between the shaft support and the restriction member, to prevent the shaft support from contacting the restriction member.

5 Claims, 3 Drawing Sheets

(56) References Cited

U.S. PATENT DOCUMENTS

| | | | |
|---|---|---|---|
| 2009/0297238 | A1 | 12/2009 | Matsuura et al. |
| 2011/0206432 | A1 | 8/2011 | Ninomiya et al. |
| 2013/0051828 | A1 | 2/2013 | Yogosawa et al. |
| 2017/0242387 | A1 | 8/2017 | Hozumi et al. |

* cited by examiner

BELT DEVICE, TRANSFER DEVICE, AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2022-008664, filed on Jan. 24, 2022, in the Japan Patent Office, the entire disclosure of which is hereby incorporated by reference herein.

BACKGROUND

Technical Field

The present disclosure relates to a belt device, a transfer device, and an image forming apparatus.

Related Art

There are belt devices including a belt that is wound around a plurality of rollers and driven to travel. In a belt device, there may be variations in parallelism, outer diameter, and circumferential length among the plurality of rollers around which the belt is wound. As a result, the belt moves to one side in the axial direction thereof while traveling, which is a phenomenon called "belt deviation." For correcting belt deviation, for example, one of the plurality of rollers around which the belt is wound is inclined in the axial direction relative to the other rollers, and force is applied to the belt to move the belt in a direction opposite to the direction in which the belt deviates.

SUMMARY

In one aspect, a belt device includes a belt wound around a plurality of support rotators, to travel by rotation of the plurality of support rotators: a belt contact member disposed on a rotation shaft of one support rotator of the plurality of support rotators, a displacement member disposed on the rotation shaft and including an inclined face to move the one support rotator, a guide to contact the inclined face and restrict a moving direction of the displacement member, a shaft support rotatably supporting the one support rotator and the rotation shaft, a restriction member to restrict movement of the one support rotator and the rotation shaft in the axial direction, and an elastically deformable intermediate member disposed between the shaft support and the restriction member in the axial direction. The belt contact member contacts an end of the belt and move in an axial direction of the rotation shaft together with movement of the belt in the axial direction. The displacement member moves in the axial direction in accordance with movement of the belt contact member. The intermediate member prevents the shaft support and the restriction member from contacting with each other.

In another aspect, a transfer device includes the belt device described above.

In another aspect, an image forming apparatus includes the belt device described above and an image forming device to form an image on the belt or a recording medium conveyed by the belt device.

In another aspect, an image forming apparatus includes the transfer device described above and an image forming device to form an image to be transferred by the transfer device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
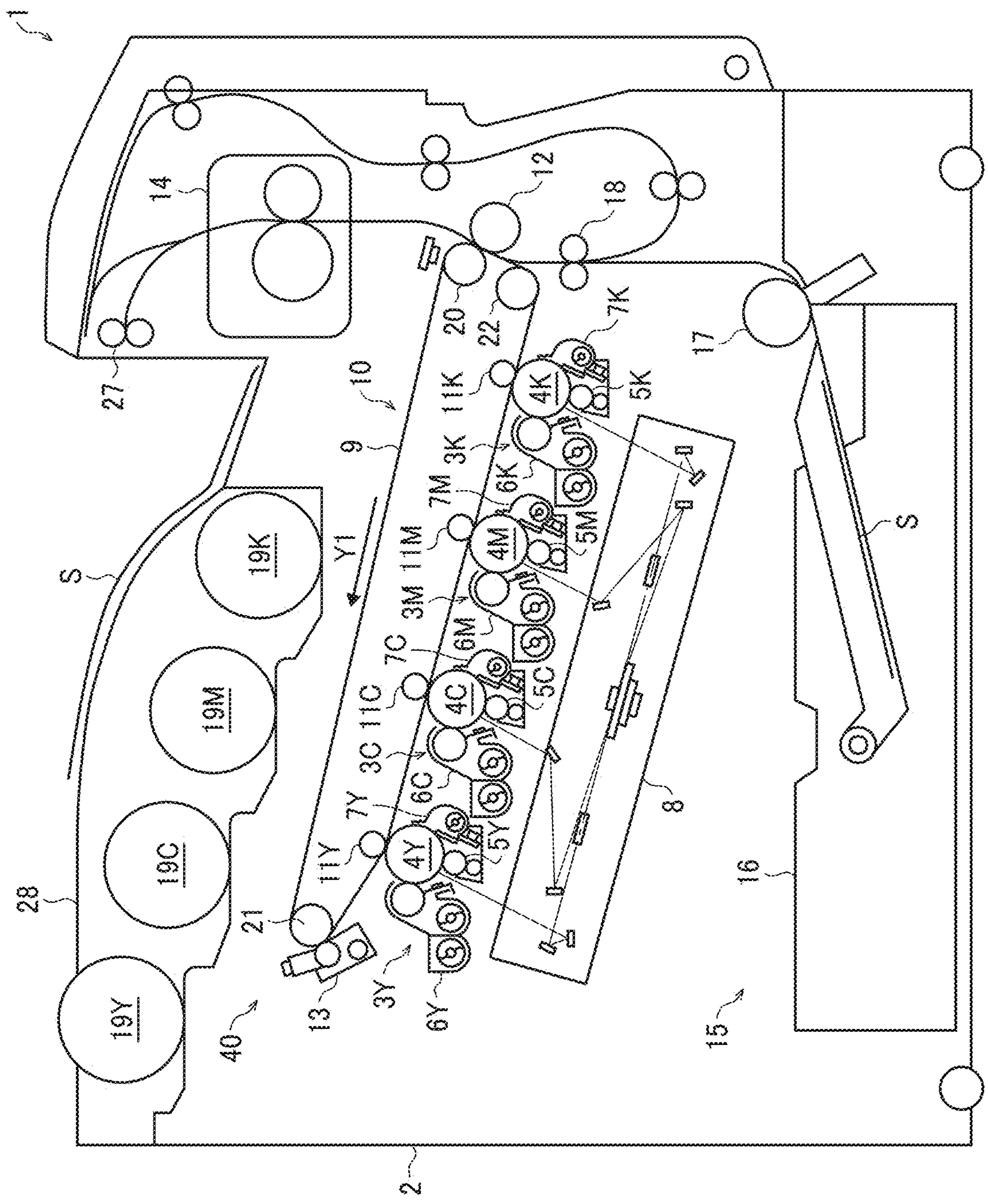
FIG. 1 is a schematic front view of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 illustrates a color copier 1 as an example of an image forming apparatus according to embodiments of the present disclosure.

The color copier 1 includes process cartridges 3Y, 3C, 3M, and 3K (hereinafter also collectively "process cartridges 3") that form toner images of yellow (Y), cyan (C), magenta (M), and black (K), respectively. The process cartridges 3 are disposed in a central portion of a body 2 of the color copier 1. The process cartridges 3Y, 3C, 3M, and 3K include photoconductor drums 4Y, 4C, 4M, and 4K as image bearers, respectively.

In FIG. 1, the photoconductor drums 4Y, 4C, 4M, and 4K (also collectively "photoconductor drums 4") rotate clockwise. Around the photoconductor drums 4Y, 4C, 4M, and 4K, charging devices 5Y, 5C, 5M, and 5K (also collectively "charging devices 5"), developing devices 6Y, 6C, 6M, and 6K (also collectively "developing devices 6"), and photoconductor cleaning devices 7Y, 7C, 7M, and 7K (also collectively "photoconductor cleaning devices 7") are disposed, respectively. Below the process cartridges 3, an optical unit 8 that irradiates each photoconductor drum 4 with laser light is disposed.

Above the process cartridges 3, an intermediate transfer unit 10 is disposed. The intermediate transfer unit 10 is a belt device that includes, as a belt, an intermediate transfer belt 9 to which toner images formed by the process cartridges 3 are transferred. The intermediate transfer unit 10 includes a plurality of support rotators that support the intermediate transfer belt 9. Specifically, the intermediate transfer belt 9 is wound around a secondary-transfer backup roller 20, a tension roller 21, and an entrance roller 22. Of these rollers, the secondary-transfer backup roller 20 is driven to rotate by a drive motor. As the secondary-transfer backup roller 20 rotates, the intermediate transfer belt 9 travels in the counterclockwise direction in FIG. 1 as indicated by arrow Y1.

The intermediate transfer belt 9 may be a single-layer belt or a multi-layer belt. The single-layer belt is preferably formed of polyvinylidene fluoride, polycarbonate, polyimide, or the like. The multi-layer belt preferably includes a base layer formed of a material, such as fluoroplastic, polyvinylidene fluoride sheet, or polyimide resin, that is less stretchy, and the surface of the belt is covered with a smooth coat layer formed of, for example, fluorine-based resin.

At the positions on the inner peripheral side of the intermediate transfer belt 9 and opposite the photoconductor drums 4Y, 4M, 4C, and 4K, primary transfer rollers 11Y, 11C, 11M, and 11K (also collectively "primary transfer rollers 11") are disposed. The primary transfer rollers 11 primarily transfer the respective toner images on the photoconductor drums 4 onto the intermediate transfer belt 9. A description is given of the formation of respective color toner images on the photoconductor drums 4 and the primary transfer of the toner images to the intermediate transfer belt 9.

Each photoconductor drum 4 rotates clockwise in FIG. 1. As a discharger irradiates a surface of the photoconductor drum 4 with light, a surface potential of the photoconductor drum 4 is initialized. After the initialization, the charging device 5 uniformly charges the surface of the photoconductor drum 4 to a given polarity (in the present embodiment, a negative polarity). The optical unit 8 emits laser beams onto the charged outer surface of the photoconductor drum 4, thus forming an electrostatic latent image of the corresponding color on the photoconductor drum 4.

The developing device 6 supply toner of corresponding color to the electrostatic latent image on the photoconductor drum 4, thereby developing the electrostatic latent image into a visible toner image. Meanwhile, the primary transfer roller 11 is applied with a primary transfer voltage opposite to the charging polarity of the toner image on the photoconductor drum 4. In the present embodiment, the primary transfer voltage has a plus (positive) polarity. Then, transfer electrical fields are generated between the photoconductor drums 4 and the corresponding primary transfer rollers 11, and the respective color toner images on the photoconductor drums 4 are electrically transferred onto the intermediate transfer belt 9. The respective color toner images are superimposed on the intermediate transfer belt 9 to form a full-color toner image on the intermediate transfer belt 9. The intermediate transfer belt 9 functions as an image bearer that bears an image on its surface. After the respective color toner images are transferred onto the intermediate transfer belt 9, the photoconductor cleaning devices 7 remove the residual toner adhering to the surfaces of the photoconductor drums 4, and the photoconductor drums 4 are prepared for subsequent image formation.

Downstream from the primary transfer roller 11K in the traveling direction of the intermediate transfer belt 9 indicated by arrow Y1, a secondary transfer roller 12 is provided. The secondary transfer roller 12 secondarily transfers, onto a transfer sheet S (a recording medium), the toner images having been primarily transferred onto the intermediate transfer belt 9. The secondary-transfer backup roller 20 presses against the secondary transfer roller 12 via the intermediate transfer belt 9, and the contact portion therebetween is called a secondary transfer nip. The secondary transfer roller 12 is applied with a predetermined secondary transfer voltage to secondarily transfer the toner images superimposed on the intermediate transfer belt 9 onto the transfer sheet S. Further, upstream from the primary transfer roller 11Y in the traveling direction (indicated by arrow Y1) of the intermediate transfer belt 9, a belt cleaner 13 is disposed. The belt cleaner 13 removes residual toner remaining on the intermediate transfer belt 9 after the image transfer. The intermediate transfer unit 10, the primary transfer rollers 11, the secondary transfer roller 12, and the belt cleaner 13 are components of a transfer device 40.

The process cartridge 3 and the optical unit 8 together function as an image forming device to form an image to be transferred by the transfer device. The process cartridge 3, the optical unit 8, and the intermediate transfer unit 10 together function as an image forming device to form an image on the belt.

Above the secondary transfer roller 12, a fixing device 14 including a heating roller and a pressure roller is disposed. The fixing device 14 fixes the toner image having been secondarily transferred onto the transfer sheet S.

A sheet feeder 15 is disposed in a lower portion of the body 2. The sheet feeder 15 includes a sheet tray 16, a sheet feeding roller 17, and a registration roller pair 18, and feeds the transfer sheet S stored in the sheet tray 16 toward the registration roller pair 18 by the sheet feeding roller 17. The registration roller pair 18 feeds the transfer sheet S toward the secondary transfer nip, where the secondary transfer roller 12 presses against the intermediate transfer belt 9, at such a timing that the toner image formed on the intermediate transfer belt 9 matches a predetermined position on the transfer sheet S.

In an upper portion of the body 2, toner bottles 19Y, 19C, 19M, and 19K (collectively "toner bottles 19") containing corresponding color toners to be supplied to the developing devices 6 are disposed.

When a full-color toner image is formed on the intermediate transfer belt 9, in the sheet feeder 15, the transfer sheets S in the sheet tray 16 are separated and fed one by one by the sheet feeding roller 17. The fed transfer sheet S is sent to the secondary transfer nip at a predetermined timing by the registration roller pair 18. The transfer sheet S bearing the full-color toner image transferred from the intermediate transfer belt 9 at the secondary transfer nip is conveyed to the fixing device 14 to fix the transferred image. After the fixing, the transfer sheet S is ejected onto an output tray 28 on an upper face of the body 2 by an ejection roller pair 27. The ejection roller pair 27 is disposed downstream from the fixing device 14 in a sheet conveyance direction. Similar to the photoconductor drums 4, the transfer residual toner remaining on the intermediate transfer belt 9 is cleaned by the belt cleaner 13. From the toner bottles 19, respective color toners are supplied to the corresponding developing devices 6 via a conveyance passage as necessary.

Image forming apparatuses such as the color copier 1 include various endless belts used as a latent image bearer, an intermediate transferor, a recording medium conveyor, and an image fixing member, in addition to the intermediate transfer belt 9.

Such an endless belt is stretched and looped around at least two support rollers and rotates in a predetermined direction. Depending on the material of the belt or tolerances of relevant components, or due to deterioration of relevant components from aging, the endless belt tends to move (deviate) to one side in a direction perpendicular to the travelling direction of the belt (i.e., belt crawl occurs), which is not desirable. When the belt deviates, the transferred image deviates with respect to the recording medium, and the belt comes off from the support rotator and is damaged. Accordingly, the belt deviation is corrected.

An image forming apparatus includes a belt alignment device that corrects the belt deviation when the belt deviation occurs. A description is given of a belt alignment device according to a comparative example.

Figure 2:
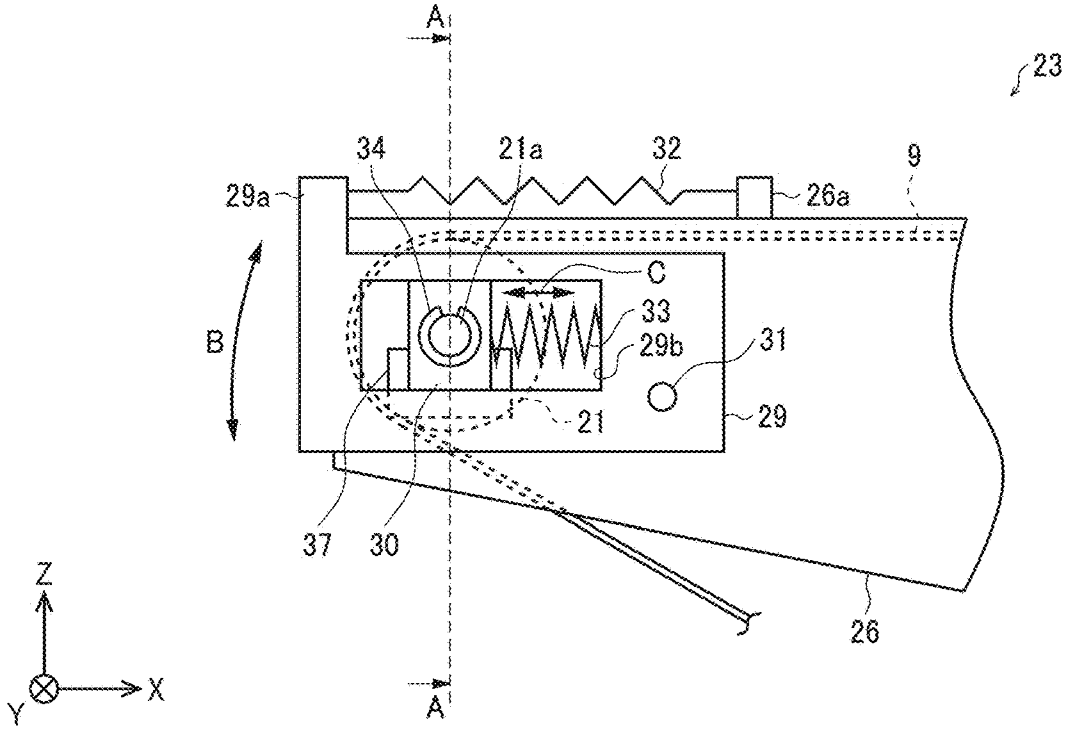
FIG. 2 is a schematic view of a belt alignment device according to a comparative example.
Figure 3:
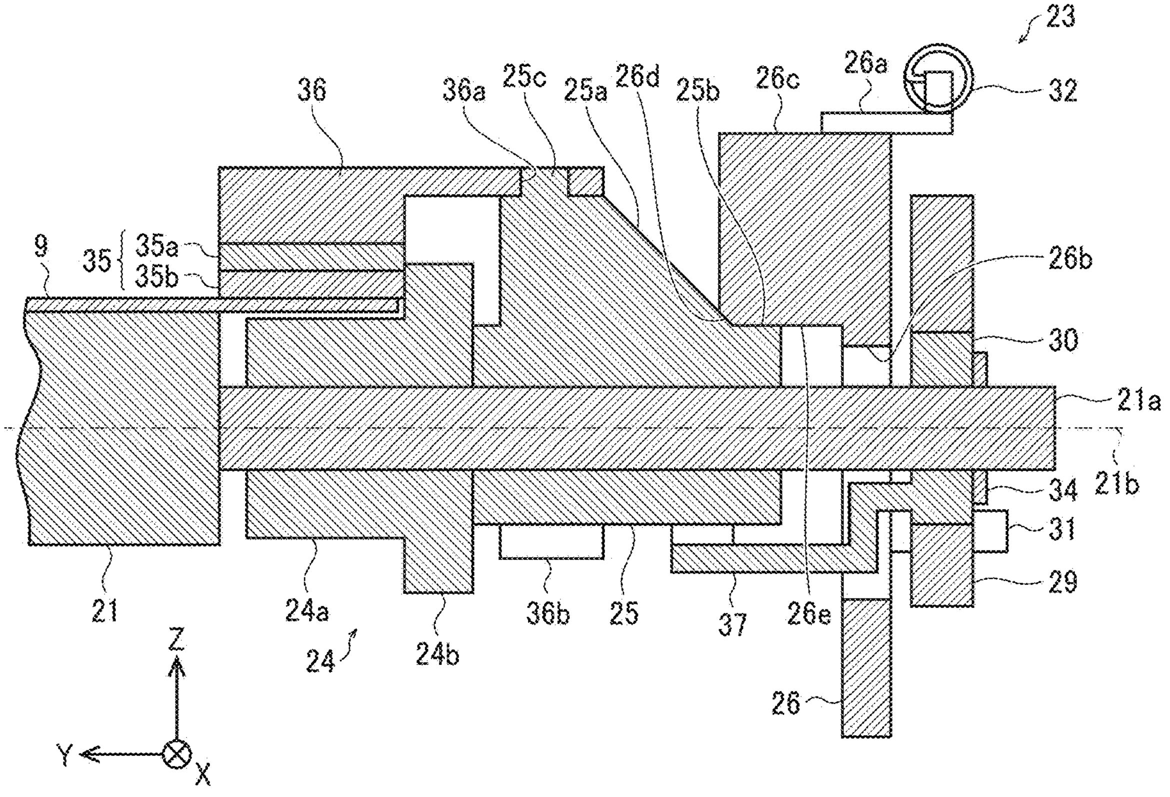
FIG. 3 is a schematic cross-sectional view taken along line A-A in FIG. 2.

FIG. 2 is a schematic view of a belt alignment device 23 according to the comparative example, provided in the intermediate transfer unit 10 from which the belt cleaner 13 is removed. FIG. 3 is an enlarged schematic cross-sectional view of a right end portion of the belt alignment device 23 taken along line A-A illustrated in FIG. 2. The belt alignment device 23 includes a shaft inclining mechanism to incline a rotation axis of the tension roller 21, which is one of the plurality of support rollers to support the intermediate transfer belt 9, thereby restricting the deviation of the intermediate transfer belt 9 within a predetermined range.

As illustrated in FIG. 3, the tension roller 21 is integral with a tension roller shaft 21*a* at an end thereof. The tension roller shaft 21*a* is a rotation shaft coaxial with a rotation center 21*b* of the tension roller 21. The tension roller shaft 21*a* is columnar, smaller in diameter than the tension roller 21, and is joined with the tension roller 21. The belt alignment device 23 includes a belt contact member 24, a shaft inclining member 25 as a displacement member, a frame 26, and a roller shaft support 29 in this order along the tension roller shaft 21*a* from the center side of the apparatus.

The tension roller shaft 21*a* penetrates the belt contact member 24, the shaft inclining member 25, the frame 26, and the roller shaft support 29. Both ends of the tension roller shaft 21*a* are supported by roller shaft supports 29 via tension roller bearings 30. The belt contact member 24 and the shaft inclining member 25 are movable in the axial direction relative to the tension roller shaft 21*a*, so as to be displaced together with the tension roller shaft 21*a* in a direction orthogonal to the axial direction, that is, a direction in which the end of the tension roller shaft 21*a* moves up and down in FIG. 3. In this specification, "axial direction" refers to that of the tension roller shaft 21*a* unless otherwise specified.

The frame 26 made of a plate material is fixed to the body 2 so as not to be displaced even when the tension roller shaft 21*a*, the belt contact member 24, and the shaft inclining member 25 are together displaced.

From an upper face of the frame 26, a spring securing portion 26*a* protrudes toward the outside of the apparatus. From a lower portion of the frame 26, a shaft support rotation shaft 31 protrudes toward the outside of the apparatus.

The frame 26 has a frame opening 26*b* penetrated by the tension roller shaft 21*a* and an inclined portion rotation preventing member 37 described later. The tension roller shaft 21*a* and the inclined portion rotation preventing member 37 are displaced in the direction perpendicular to the rotation center 21*b* by a pressing force of a tension spring 33 and a force against the pressing force, and a pressing force of a biasing spring 32 and a force against the pressing force. The frame opening 26*b* is shaped so that the tension roller shaft 21*a* and the inclined portion rotation preventing member 37 do not interfere with the frame 26 regardless of such displacement.

The shaft support rotation shaft 31 supports the roller shaft support 29 to pivot in the direction indicated by arrow B in FIG. 2 relative to the frame 26. One end of the biasing spring 32 is secured to the spring securing portion 26*a*. The biasing spring 32 is an extension coil spring that exerts a biasing force on the roller shaft support 29. The other end of the biasing spring 32 is secured to a spring securing portion 29*a* integral with the roller shaft support 29.

The roller shaft supports 29 disposed at both ends of the tension roller shaft 21*a* are pivotably supported by the shaft support rotation shafts 31 fixed to frames 26. The biasing springs 32 pull the roller shaft supports 29 to rotate around the shaft support rotation shafts 31 clockwise in FIG. 2, respectively. As the roller shaft support 29 pivots around the shaft support rotation shaft 31, the end of the tension roller shaft 21*a* supported by the roller shaft support 29 via the tension roller bearing 30 is displaced in the vertical direction in FIGS. 2 and 3.

Each of the two roller shaft supports 29 has a slot 29*b* which is a rectangular hole in a center portion thereof. In each slot 29*b*, the tension roller bearing 30 is supported so as to move in the radial direction of the tension roller shaft 21*a* indicated by arrow C in FIG. 2. Inside the slot 29*b*, the tension spring 33 is disposed. The tension spring 33 is a compression coil spring that exerts, on the tension roller bearing 30, a biasing force tending outward from the center of rotation of the roller shaft support 29. With this configuration, the tension roller 21 constantly receives a force in a direction away from the secondary-transfer backup roller by the biasing force of the tension spring 33 and applies a predetermined tension to the intermediate transfer belt 9.

As illustrated in FIG. 3, on a portion of the tension roller shaft 21*a* between the tension roller 21 and the tension roller bearing 30, the belt contact member 24 and the shaft inclining member 25 are disposed. The shaft inclining member 25 is further from the center of the apparatus than the belt contact member 24. The further side from the center of the apparatus may be referred to as "outer side" or "outside of the apparatus." The belt contact member 24 includes a cylindrical portion 24*a* having an outer diameter smaller than that of the tension roller 21, and a flange portion 24*b* having an outer diameter larger than that of the tension roller 21 on the outer side of the cylindrical portion 24*a* (further side from the center of the apparatus). When the intermediate transfer belt 9 deviates toward the outer side of the apparatus, the end of the intermediate transfer belt 9 comes into contact with the inner face of the flange portion 24*b*.

The shaft inclining member 25 has an inclined face 25*a*, a stopper face 25*b*, and a positioning portion 25*c*. The inclined face 25*a* is at an upper portion of the shaft inclining member 25 and inclined relative to the tension roller shaft 21*a*. The stopper face 25*b* is continuous with a bottom of the inclined face 25*a*. The positioning portion 25*c* is disposed in an upper portion of the inclined face 25*a* and secures a pressing member holder 36 to be described later. The inclined face 25*a* is a curved face that conforms to a conical peripheral surface centered on the rotation center 21*b* when the shaft inclining member 25 is attached to the tension roller shaft 21*a*. The stopper face 25*b* is curved to conform to the peripheral surface of a columnar shape centered on the rotation center 21*b*.

In this example, the inclination of the inclined face 25*a* relative to the rotation center 21*b* is 30°, but the inclination is not limited thereto. The shaft inclining member 25 is prevented from rotating around the tension roller shaft 21*a* by the inclined portion rotation preventing member 37 to be described later.

When the end of the intermediate transfer belt 9 contacts the inner face of the flange portion 24*b* and further moves toward the outer side of the apparatus, the belt contact member 24 and the shaft inclining member 25 move on the tension roller shaft 21*a* toward the outer side of the apparatus with the movement of the intermediate transfer belt 9. Restriction members 34 respectively provided on outer side of the tension roller bearings 30 in the axial direction restrict the movement of the tension roller 21 and the tension roller shaft 21*a* toward the outer side in the axial direction. Each restriction member 34 is an E-ring and disposed in the vicinity of the outer side of the tension roller bearing 30. Each restriction member 34 is secured not to move in the axial direction relative to the tension roller shaft 21*a* and so that the tension roller shaft 21*a* is rotatable.

The frame 26 has a guide portion 26*c* protruding toward into the apparatus. The guide portion 26*c* includes a contact portion 26*d* at a lower corner thereof and a stopper face 26*e* on a lower face thereof. The contact portion 26*d* has a curved face that comes into contact with the inclined face 25*a*. As illustrated in FIG. 3, in an initial state in which the end of the intermediate transfer belt 9 is not in contact with the inner face of the flange portion 24*b*, the contact portion 26*d* is in contact with the lower end of the inclined face 25*a*, and the stopper face 26*e* is in contact with the stopper face 25*b*, thereby positioning the shaft inclining member 25. With this configuration, the stopper face 25*b* functions as a positioning portion, and the inclination of the tension roller 21 relative to the rotation center 21*b* in the initial state of assembled state can be made constant.

A description is given of operation of the belt alignment device 23.

When the secondary-transfer backup roller 20 that is a drive roller is driven to rotate, the tension roller 21 that is a driven roller starts rotating in accordance with the traveling of the intermediate transfer belt 9. At this time, when the end or the vicinity of the end of the intermediate transfer belt 9 is in contact with the cylindrical portion 24*a* of the belt contact member 24, the belt contact member 24 also starts rotating.

In the above-described state, when belt deviation occurs, that is, the end of the intermediate transfer belt 9 moves toward the outside of the apparatus due to the influence of parallelism between the members or the like, the end of the intermediate transfer belt 9 comes into contact with the inner face of the flange portion 24*b*. When the intermediate transfer belt 9 further moves toward the outside of the apparatus, the belt contact member 24 in contact with the end of the intermediate transfer belt 9 moves toward the outside of the apparatus. Then, the shaft inclining member 25 disposed on the outer side of the belt contact member 24 follows the movement of the belt contact member 24 and moves toward the outside of the apparatus.

As illustrated in FIG. 3, the contact portion 26*d* is in contact with the inclined face 25*a*, and the vicinity of the end of the tension roller shaft 21*a* is supported by the roller shaft support 29 via the tension roller bearing 30. Since the biasing spring 32 biases the roller shaft support 29 to pivot clockwise in FIG. 2 around the shaft support rotation shaft 31, the tension roller shaft 21*a* is biased upward in FIG. 3.

In a state in which the end of the intermediate transfer belt 9 is not in contact with the inner face of the flange portion 24*b*, the stopper face 25*b* of the shaft inclining member 25 is urged upward by the biasing spring 32 and contacts the stopper face 26*e*. Accordingly, the contact position between the inclined face 25*a* and the contact portion 26*d* is restricted to the position where the stopper face 25*b* is in contact with the stopper face 26*e*. Accordingly, in the state in which the contact portion 26*d* is in contact with the lower end of the inclined face 25*a*, the relative positions thereof are maintained.

From this state, as described above, when the intermediate transfer belt 9 receives a moving force tending to the outside of the apparatus, that is, to the right side in FIG. 3, the end of the intermediate transfer belt 9 comes into contact with the inner face of the flange portion 24*b*. When the intermediate transfer belt 9 further receives the moving force tending to the outside of the apparatus from this state, the belt contact member 24 and the shaft inclining member 25 move toward the outside of the apparatus along the tension roller shaft 21*a*.

At this time, the contact portion 26*d* relatively moves along the inclined face 25*a*, thereby displacing the contact position between the inclined face 25*a* and the contact portion 26*d* upward on the inclined face 25*a*. As a result, the end of the tension roller shaft 21*a* on the side to which the intermediate transfer belt 9 deviates is pushed down against the upward biasing force exerted by the biasing spring 32.

On the other hand, the end of the intermediate transfer belt 9 on the side opposite to the direction to which the intermediate transfer belt 9 deviates is not in contact with the inner face of the flange portion 24*b*. Therefore, on the end portion of the tension roller shaft 21*a* on the side opposite to the direction to which the intermediate transfer belt 9 deviates, the contact portion 26*d* is kept in contact with the lower end of the inclined face 25*a*, similar to the state illustrated in FIG. 3.

As a result, the end portion of the tension roller shaft 21*a* on the side to which the intermediate transfer belt 9 deviates is pressed down relative to the other end portion, and the tension roller shaft 21*a* is inclined downward in FIG. 3.

As the tension roller shaft 21*a* thus inclines, the speed at which the intermediate transfer belt 9 deviates to the outer side slows down, and, eventually, the intermediate transfer belt 9 moves opposite to the deviation direction. As a result, the position of the intermediate transfer belt 9 in the belt width direction returns gradually, and the intermediate transfer belt 9 reliably travels at the position without deviation. The same is true for the case where the intermediate transfer belt 9 deviates to the opposite side.

The principle of correcting the deviation of the intermediate transfer belt 9 by inclining the tension roller shaft 21*a* is disclosed in, for example, Japanese Unexamined Patent Application Publication No. 2017-58651.

The belt alignment device 23 includes a pressing member 35 that faces the outer circumferential surface of the intermediate transfer belt 9 at a position near the end of the intermediate transfer belt 9 wound around the tension roller 21. When viewed from the axial direction of the rotation center 21*b*, the pressing member 35 has a gate shape in which the bottom is open. The pressing member 35 is fixed to the shaft inclining member 25 via the pressing member holder 36. The shaft inclining member 25 moves in the vertical direction in conjunction with the displacement of the tension roller shaft 21*a*. Accordingly, when the tension roller shaft 21*a* moves up and down with the deviation of the intermediate transfer belt 9, the pressing member 35 fixed to the shaft inclining member 25 also moves up and down.

Thus, the pressing member 35 constantly presses the surface of the end portion of the intermediate transfer belt 9 wound around the tension roller 21 driven the tension roller shaft 21*a*, and deformation of the end portion of the intermediate transfer belt 9 can always be minimized.

The pressing member 35 includes a foam layer 35*a* formed of a material having a cell structure and a surface layer 35*b* is formed of a material having low slidability. The foam layer 35*a* is attached to the pressing member holder 36, and the surface layer 35*b* that contacts the outer face of the intermediate transfer belt 9 is jointed to the bottom of the foam layer 35*a*. Each of the foam layer 35*a* and the surface layer 35*b* may be made of any material that prevents deformation of the intermediate transfer belt 9 and does not damage the intermediate transfer belt 9.

In addition, an end face of the pressing member 35 on the outer side in the axial direction contacts the inner face of the flange portion 24*b*. Thus, in a state where the end face of the intermediate transfer belt 9 is in contact with the inner face of the flange portion 24*b*, the end of the intermediate transfer belt 9 can be constantly pressed by the pressing member 35.

The pressing member holder 36 has a fitting hole 36*a* into which the positioning portion 25*c* is fitted, and two claw portions 36*b* that engage with the bottom face of the shaft inclining member 25. The pressing member holder 36 is detachably attached to the shaft inclining member 25 as follows. The claw portions 36*b* are moved in the direction perpendicular to the paper surface direction of FIG. 3 to move away from each other so as to expand the opened bottom of the pressing member holder 36. The positioning portion 25*c* is fitted into the fitting hole 36*a*, after which the expanded bottom of the pressing member holder 36 is closed so that the claw portions 36*b* engages with the bottom face of the shaft inclining member 25.

When the intermediate transfer belt 9 deviates to one side, in the above-described belt alignment device 23, the belt contact member 24 and the shaft inclining member 25 move toward the outside of the apparatus in accordance with the movement of the end of the intermediate transfer belt 9. At this time, as the shaft inclining member 25 moves such that the inclined face 25*a* follows the contact portion 26*d*, the tension roller 21 is inclined, and the pressing member 35 is also inclined in conjunction therewith. As a result, deformation and damage of the end of the intermediate transfer belt 9 can be reduced even in an apparatus in which the tension roller 21 is inclined to prevent belt deviation. Further, attaching the pressing member holder 36 that holds the pressing member 35 to the shaft inclining member can obviate a member for attaching the pressing member holder 36 to the tension roller shaft 21*a*, and space is saved.

Next, descriptions are given of the inclined portion rotation preventing member 37 that prevents the shaft inclining member 25 from rotating around the tension roller shaft 21*a*.

The inclined portion rotation preventing member 37 has a gate shape which covers the shaft inclining member 25 along the side face and the bottom face of the shaft inclining member 25 and is opened upward when viewed in the axial direction. The inclined portion rotation preventing member 37 is integral with the tension roller bearing 30. Therefore, even if a force in the rotational direction acts on the shaft inclining member 25 by the rotation of the tension roller 21 and the tension roller shaft 21*a*, the shaft inclining member 25 is prevented from rotating. The inclined portion rotation preventing member 37 does not include a portion that contacts both end portions of the shaft inclining member 25 in the axial direction. The inclined portion rotation preventing member 37 is shaped not to prevent the shaft inclining member 25 from moving along the axial direction of the tension roller shaft 21*a*. Accordingly, when the intermediate transfer belt 9 deviates to one side, the shaft inclining member 25 can in the axial direction without rotating around the tension roller shaft 21*a*.

Since the inclined portion rotation preventing member 37 is joined with the tension roller bearing 30, the inclined portion rotation preventing member 37 moves together with the tension roller shaft 21*a* in the direction indicated by arrow C in FIG. 2 in which the tension roller bearing 30 slides. Further, the tension roller bearing 30 to which the inclined portion rotation preventing member 37 is joined is supported by the roller shaft support 29. Accordingly, when the roller shaft support 29 rotates in the direction indicated by arrow B in FIG. 2 and the tension roller shaft 21*a* moves in the vertical direction, the inclined portion rotation preventing member 37 also moves in the vertical direction together with the tension roller shaft 21*a*.

A description is given of an inconvenience of the belt alignment device 23 according to the comparative example When the intermediate transfer belt 9 deviates to one side, in the belt alignment device 23, the belt contact member 24 and the shaft inclining member 25 move toward the outside of the apparatus in accordance with the movement of the end of the intermediate transfer belt 9. When the inclined face 25*a* moves toward the outside of the apparatus by this movement, the frame 26 including the contact portion 26*d* in contact with the inclined face 25*a* causes the tension roller 21, the tension roller shaft 21*a*, the belt contact member 24, and the shaft inclining member 25 to move downward. This movement controls the movement of the end of the intermediate transfer belt 9 and eliminates the deviation of the intermediate transfer belt 9. Then, the tension roller 21, the tension roller shaft 21*a*, the belt contact member 24, and the shaft inclining member 25 move upward.

During the above-described operation, the tension roller 21, the tension roller shaft 21*a*, the belt contact member 24, and the shaft inclining member 25 move in the vertical direction, and the tension roller bearing 30 and the restriction member 34 also move in the vertical direction in accordance with the movement of the tension roller shaft 21*a*.

In the configuration in which one roller is inclined in order to control the belt deviation, the inclined roller itself receives an external force moving in the axial direction. Although the restriction member 34 does not move in the axial direction relative to the tension roller shaft 21*a*, the tension roller bearing 30 moves in the axial direction relative to the tension roller shaft 21*a*. Accordingly, the tension roller bearing 30 contacts and slides on the restriction member 34, causing friction and wear between the tension roller bearing 30 and the restriction member 34, which may lower the positioning accuracy of the tension roller 21 in the axial direction.

In view of the foregoing, a description is given of a belt alignment device 38 according to the present embodiment that solves the above-described inconvenience.

Figure 4:
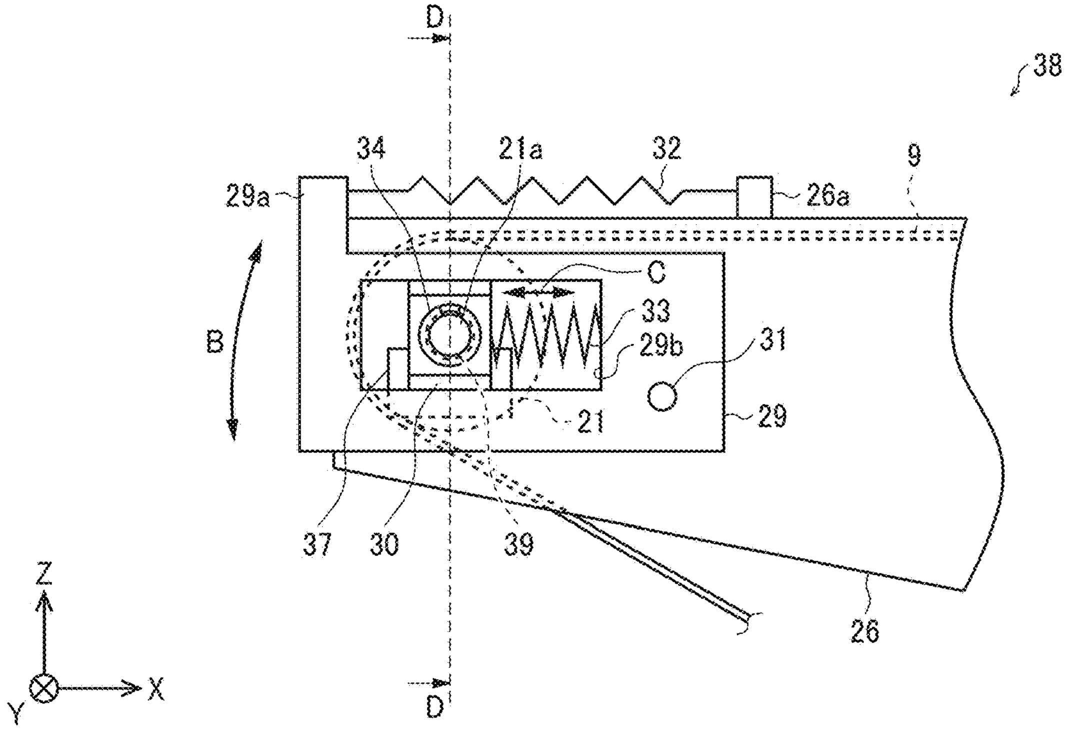
FIG. 4 is a schematic view of a belt alignment device according to an embodiment of the present disclosure.
Figure 5:
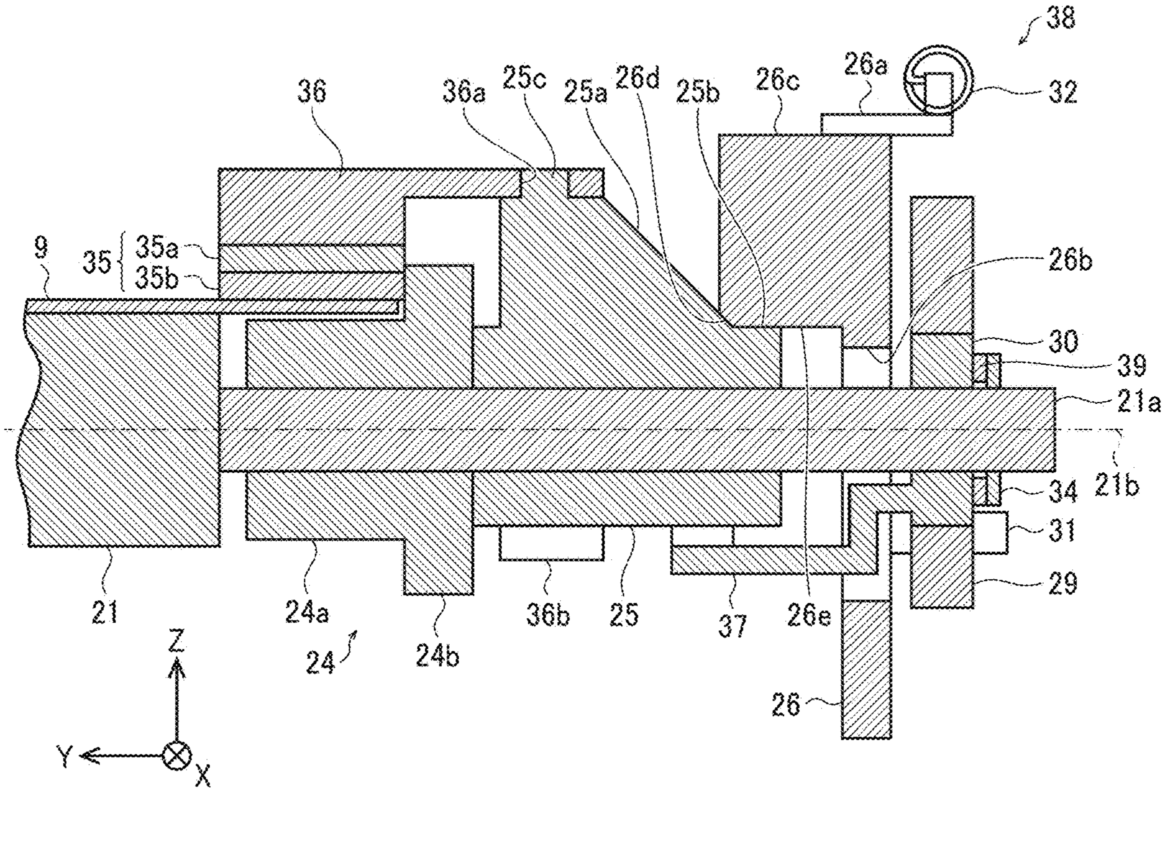
FIG. 5 is a schematic cross-sectional view taken along line D-D in FIG. 4.

FIG. 4 is a schematic view of the belt alignment device 38 according to the present embodiment provided in the intermediate transfer unit 10 from which the belt cleaner 13 is removed. FIG. 5 is an enlarged schematic cross-sectional view of the right end portion of the belt alignment device 38 taken along the line D-D in FIG. 4.

As illustrated in FIGS. 4 and 5, the belt alignment device 38 according to the present embodiment is different from the above-described comparative belt alignment device 23 in that an intermediate member 39 is provided between the tension roller bearing 30 and the restriction member 34. Other than that, the belt alignment device 38 is similar in configuration to the belt alignment device 23.

The intermediate member 39 has a circular outer shape similar to the restriction member 34 and is slightly smaller than the restriction member 34. The intermediate member 39 has a hole through which the tension roller shaft 21*a* passes. The hole is larger in diameter than the tension roller shaft 21*a*.

The intermediate member 39 is an elastically deformable, made of a resin material, rubber, or the like, and is provided between the tension roller bearing 30 and the restriction member 34 in the axial direction. The intermediate member 39 is sandwiched between the tension roller bearing 30 and the restriction member 34 in a state in which the periphery defining the hole thereof is free from contact with the tension roller shaft 21*a* and in a state in which the intermediate member 39 is slightly elastically deformed by the tension roller bearing 30 and the restriction member 34.

With this structure, the present embodiment provides the following actions and effects. At the occurrence of deviation of the intermediate transfer belt 9, when the tension roller shaft 21*a* is moved by the action of the belt alignment device 38 and the tension roller bearing 30 and the restriction member 34 move in the vertical direction, the amount of relative movement differs between the tension roller bearing 30 and the restriction member 34. Since the elastically deformable intermediate member 39 is provided between the tension roller bearing 30 and the restriction member 34, the difference in the amount of relative movement between the tension roller bearing 30 and the restriction member 34 is absorbed by the elastic deformation of the intermediate member 39. This prevents unexpected friction or wear between the tension roller bearing 30 and the restriction member 34 due to direct sliding therebetween, and accordingly prevents a decrease in positioning accuracy of the tension roller 21 and the tension roller shaft 21*a* in the axial direction. As a result, in the intermediate transfer unit 10 and the transfer device 40 and the color copier 1 using the intermediate transfer unit 10, the belt deviation is satisfactory controlled over a long period of time even when an external force in the axial direction acts on the tension roller 21 controlling the belt deviation.

In addition, the elastically deformable intermediate member 39 prevents unexpected friction or wear among the intermediate member 39, the tension roller bearing 30, and the restriction member 34 even when the relative movement amounts differ between the tension roller bearing 30 and the restriction member 34. Accordingly, this configuration prevents a decrease in positioning accuracy of the tension roller 21 and the tension roller shaft 21*a* in the axial direction.

Further, since the intermediate member 39 does not rotate following the rotation of the tension roller 21 and the tension roller shaft 21*a*, unexpected friction and wear between the intermediate member 39 and each of the tension roller bearing 30 and the restriction member 34 is further prevented.

Further, the intermediate member 39 made of a resin material is advantageous in reducing the weight of the apparatus, improving the operability of the apparatus, and expanding the life of the apparatus. Thus, the cost can be reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. For example, although the intermediate transfer belt 9 is described in the above-described embodiment, the belt member to which aspects of the present disclosure are applied is not limited thereto. One or more aspects of the present disclosure can be applied to any belt wound around a plurality of support rotators and travels with rotation of the plurality of support rotators.

Further, although the belt alignment device 38 in the above-described embodiment includes the pressing member 35 and the pressing member holder 36, the belt alignment device to which aspects of the present disclosure can be applied may not include the pressing member 35 and the pressing member holder 36.

The advantages achieved by the embodiments described above are examples and therefore are not limited to those described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A belt device, comprising:

a belt wound around a plurality of support rotators and configured to travel by rotation of the plurality of support rotators;

a belt contact member disposed on a rotation shaft of one support rotator of the plurality of support rotators, the belt contact member being configured to contact an end of the belt and move in an axial direction of the rotation shaft together with movement of the belt in the axial direction;

a displacement member disposed on the rotation shaft and including an inclined face configured to move the one support rotator, the displacement member being configured to move in the axial direction in accordance with movement of the belt contact member;

a guide configured to contact the inclined face and restrict a moving direction of the displacement member;

a shaft support disposed on the rotation shaft and configured to rotatably support the one support rotator and the rotation shaft;

a restriction member disposed on the rotation shaft and secured to the rotation shaft to limit axial movement thereof on the rotation shaft, the restriction member being configured to restrict movement of the one support rotator and the rotation shaft in the axial direction; and an intermediate member disposed on the rotation shaft and between the shaft support and the restriction member in the axial direction, the intermediate member being configured to elastically deform and restrict contact between the shaft support and the restriction member.

2. The belt device of claim 1, wherein the intermediate member is disposed on an axially outer side of the shaft support, and the restriction member is disposed on an axially outer side of the intermediate member.

3. A transfer device comprising the belt device according to claim 1.

4. An image forming apparatus comprising:

the transfer device according to claim 3; and an image forming device configured to form an image to be transferred by the transfer device.

5. An image forming apparatus comprising:

the belt device according to claim 1; and an image forming device configured to form an image on the belt or a recording medium conveyed by the belt device.

* * * * *